United States Patent [19]

Tajima et al.

[11] Patent Number: 4,469,412
[45] Date of Patent: Sep. 4, 1984

[54] WIDE ANGLE ZOOM LENS

[75] Inventors: Akira Tajima; Keiji Ikemori, both of Kanagawa, Japan

[73] Assignee: Canon Kabushiki Kaisha, Tokyo, Japan

[21] Appl. No.: 551,492

[22] Filed: Nov. 14, 1983

Related U.S. Application Data

[63] Continuation of Ser. No. 308,562, Oct. 5, 1981, abandoned.

[30] Foreign Application Priority Data

Oct. 14, 1980 [JP] Japan .................. 55-143449

[51] Int. Cl.³ .................. G02B 13/18; G02B 15/14
[52] U.S. Cl. .................. 350/426; 350/432
[58] Field of Search .................. 350/432–435, 350/426

[56] References Cited

U.S. PATENT DOCUMENTS 3,880,498 4/1975 Liu et al. .................. 350/426
4,153,339 5/1979 Tajima et al. .................. 350/426
4,159,865 7/1979 Kawamura et al. .................. 350/426
4,241,981 12/1980 Okudaira .................. 350/426
4,400,064 8/1983 Ikemori et al. .................. 350/426

Primary Examiner—John K. Corbin
Assistant Examiner—Scott J. Sugarman
Attorney, Agent, or Firm—Toren, McGeady and Stanger

[57] ABSTRACT

The wide angle zoom lens disclosed includes, from front to rear, a negative first lens group and a positive second lens group, both of which are moved axially in variable relation to each other to effect a change in the image magnification. The first lens group includes, front to rear, a first lens with a rear surface of strong negative refractive power, a second lens of convex curvature towards the front with a focal length having an absolute value not less than 30 times the shortest focal length of the entire system and with at least one of the surfaces thereof aspherical and a positive meniscus 3rd lens of forward convexity. According to one embodiment, the second lens is made of glass and according to another, of plastic.

4 Claims, 39 Drawing Figures

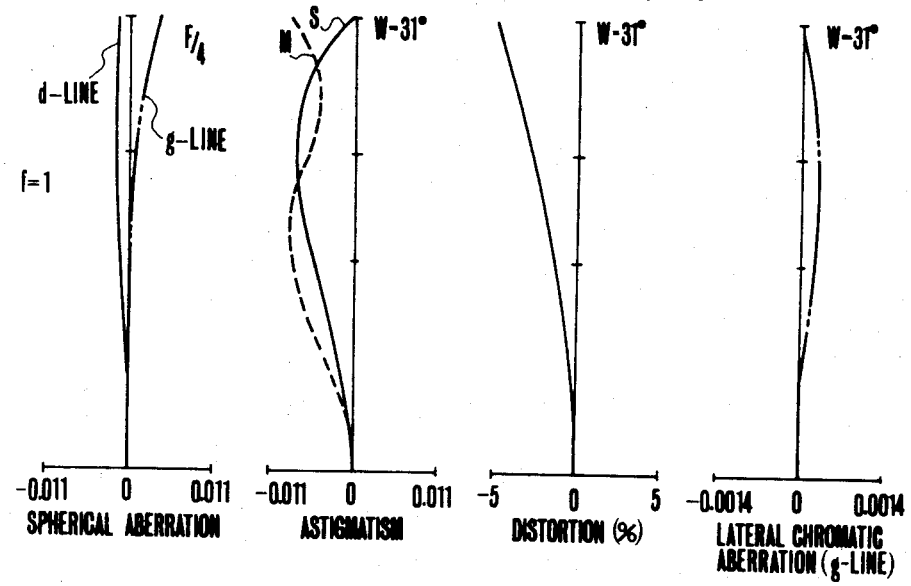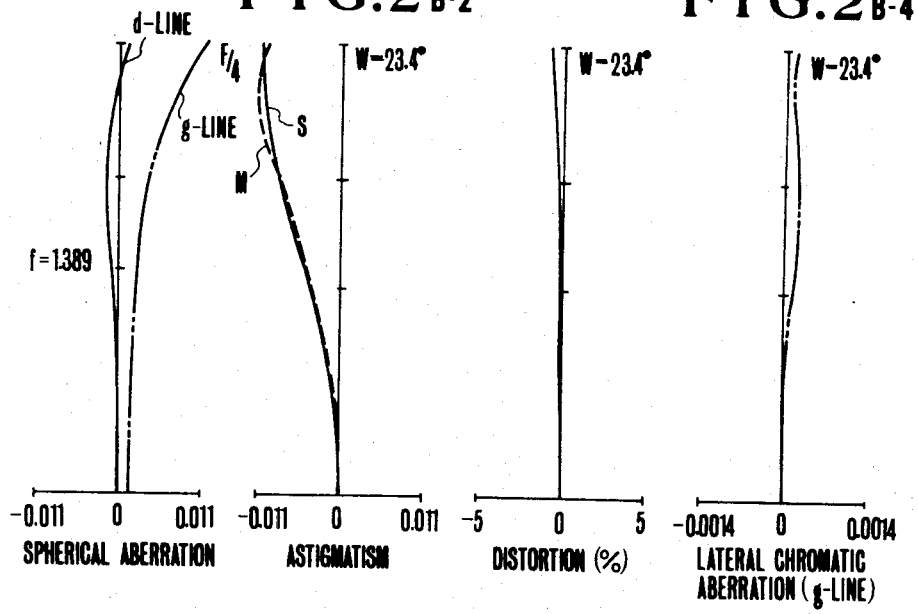

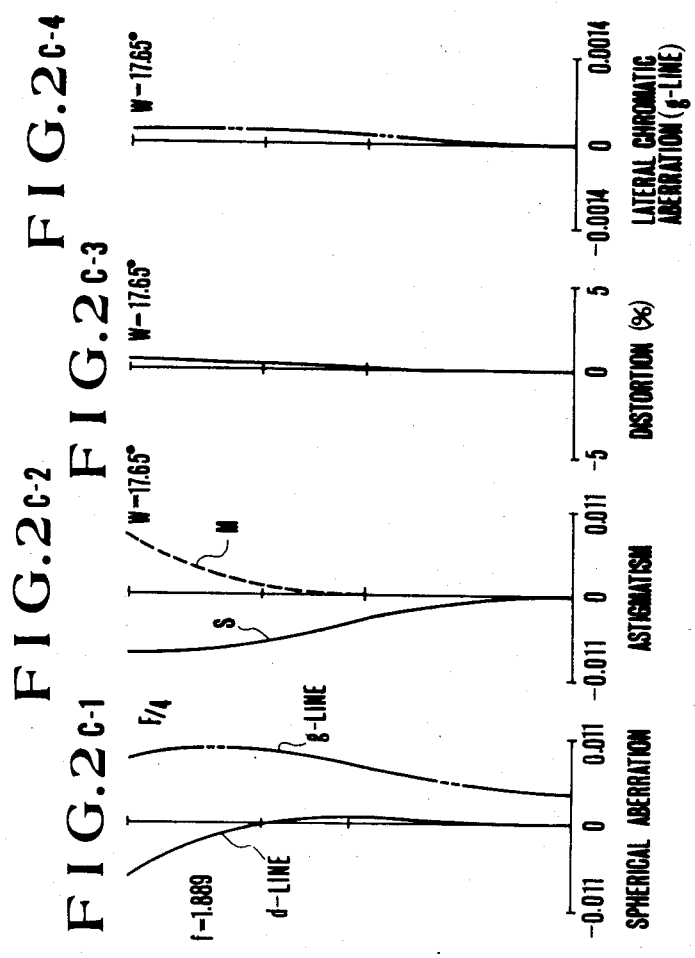

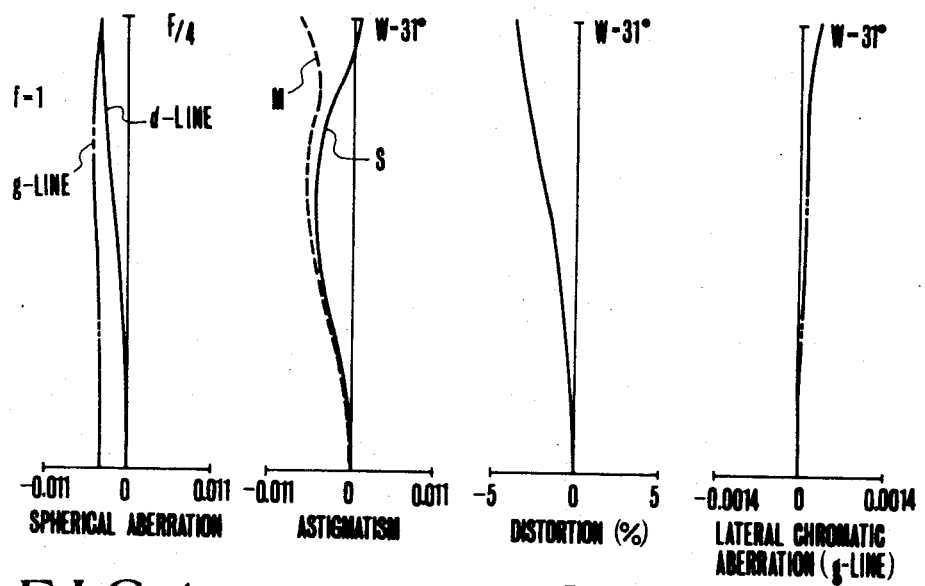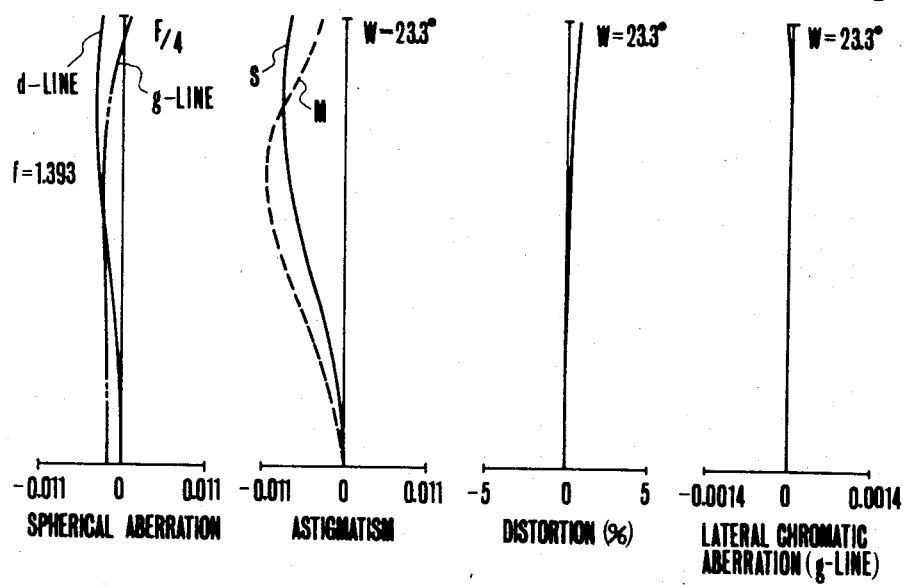

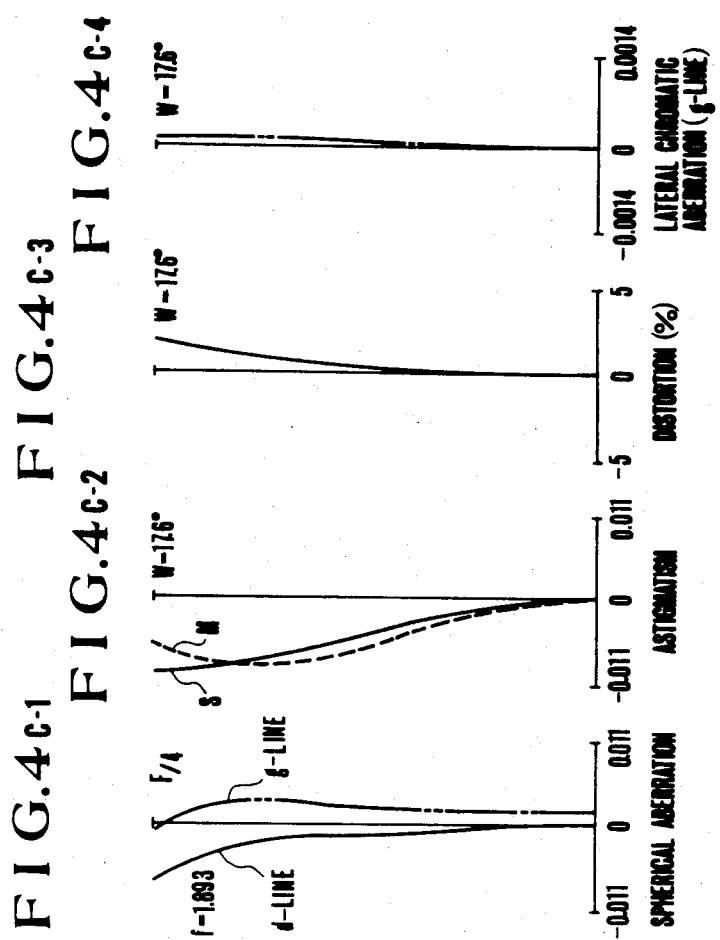

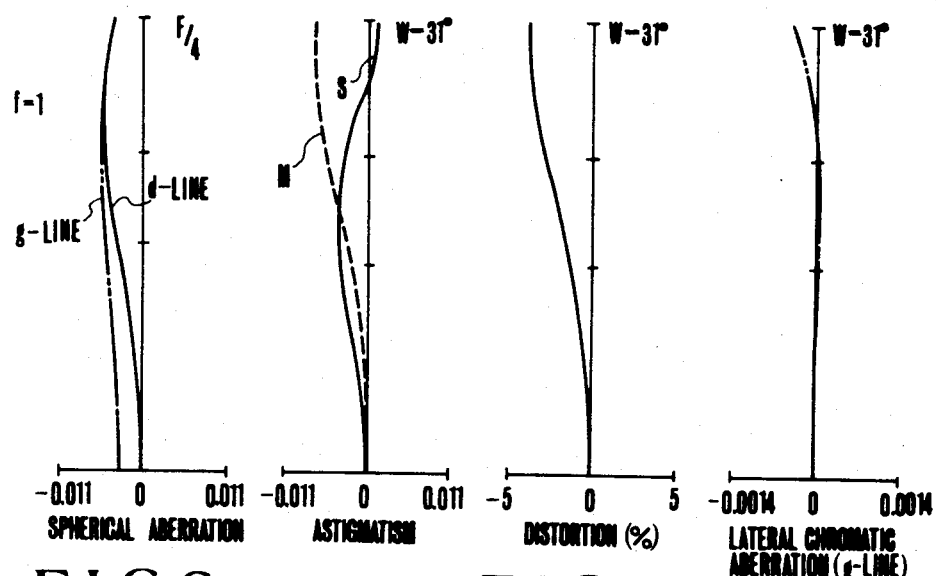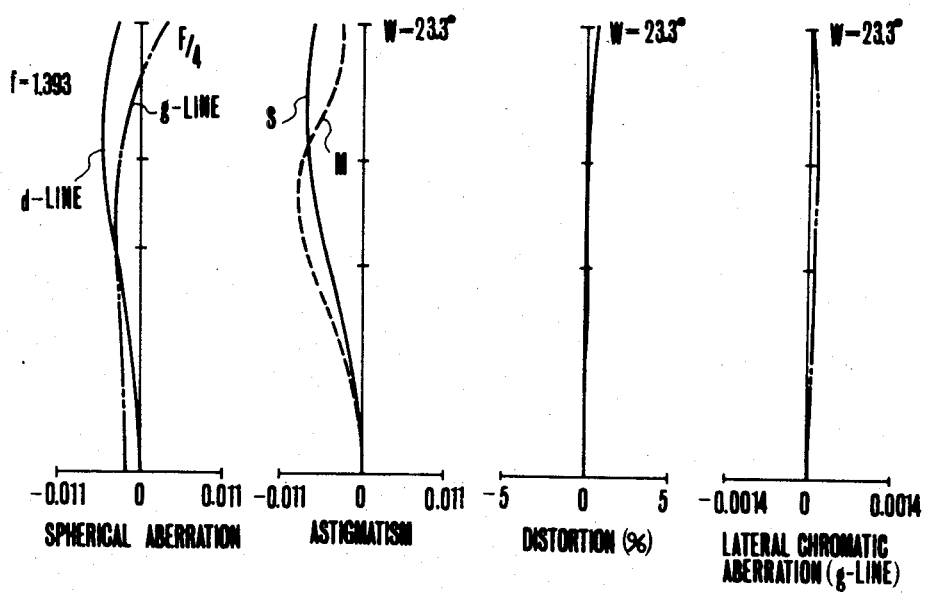

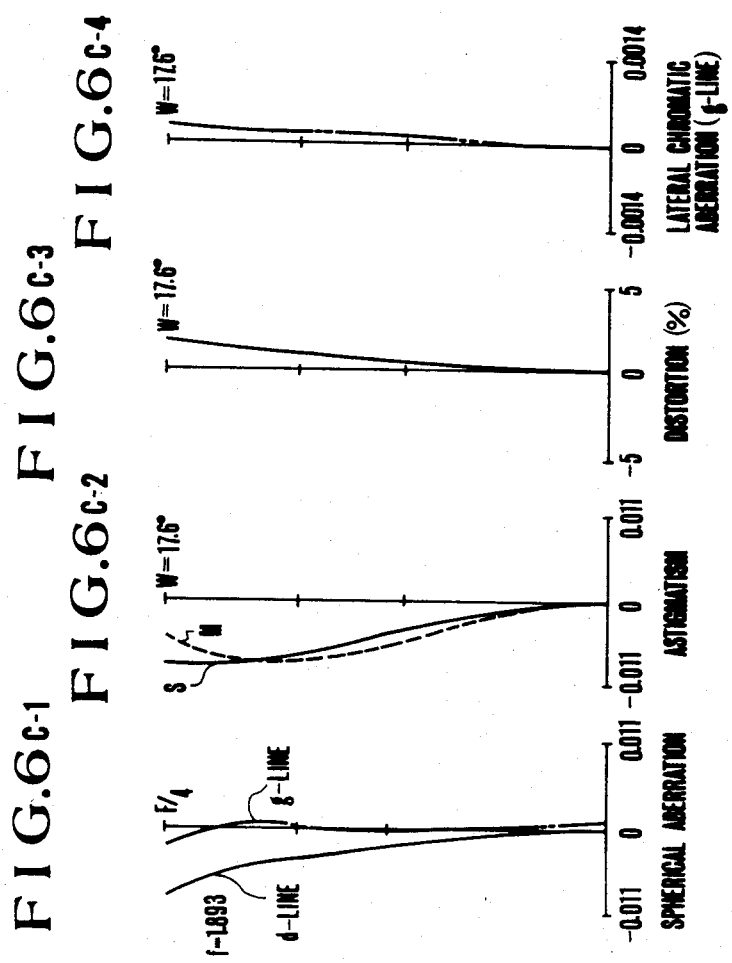

WIDE ANGLE ZOOM LENS

This application is a continuation of application Ser. No. 308,562, filed Oct. 5, 1981 now abandoned.

BACKGROUND OF THE INVENTION

1. Field of the Invention

This invention relates to photographic wide angle zoom lenses of the two-group type.

2. Description of the Prior Art

In general, photographic zoom lens can be varied from a wide angle region to a semi-telephoto region, and often the measure of increasing the number of constituent lens elements is taken, to achieve improvements in optical performance. The increase of the lens element number generally leads to the possibility of improving optical performance, but the complexity of the lens system is increased as a whole with the increase in the size. This results in disadvantages. The handling becomes inconvenient and the lens unit cost goes up.

To avoid an increase in the bulk and size of a zoom lens, it is the most effective to reduce the number of lens elements in each of the groups constituting the zoom lens. Particularly the 1st lens group counting from the front in most cases has the largest diameter, which is most responsible for the increase in the bulk and size of the zoom lens. Therefore, it has been the common practice to reduce the number of lens elements in the first group and to simplify the lens configuration so that a minimization of the bulk and size of the complete zoom lens is facilitated, as disclosed in, for example, Japanese Laid Open Patents Sho 53-60246 and Sho 54-114236. Any of these conventional lenses is, however, made to cover a relatively narrow angular field, and can be hardly said to belong to the category of zoom lenses of a range including the wide angle region.

It is also known to construct the first lens group from three lens elements as disclosed in U.S. Pat. No. 4,155,629 and from four lens elements with the use of an aspherical surface as disclosed in U.S. Pat. No. 4,159,865.

SUMMARY OF THE INVENTION

An object of the present invention is to provide a zoom lens of a range including the wide angle region which enables a much-desired reduction of the bulk and size and of the production cost to be achieved while preserving good stability of aberration correction throughout the zooming range, as will be seen from embodiments thereof to be described later.

One of the features of the invention is that the zoom lens is constructed from two lens groups of which the first counting from the front is negative in power and the second is positive, both of the groups being axially movable to effect zooming, and the first lens group is constructed of three lenses, of which the first counting from the front is negative in power, the second has an aspherical surface and is of the meniscus form with a very small refractive power, and the third is a positive lens.

BRIEF DESCRIPTION OF THE DRAWINGS

FIGS. 2-A-1 to 4, 2-B-1 to 4 and 2-C-1 to 4 are graphic representations of the various aberrations of the specific lens of FIG. 1 in three different zooming positions.

FIGS. 4-A-1 to 4, 4-B-1 to 4 and 4-C-1 to 4 are graphic representations of the various aberrations of the specific lens of FIG. 3 in three different zooming positions.

FIGS. 6-A-1 to 4, 6-B-1 to 4 and 6-C-1 to 4 are graphic representations of the various aberrations of the specific lens of FIG. 5 in three different zooming positions.

DETAILED DESCRIPTION OF THE PREFERRED EMBODIMENTS

Figure 1:
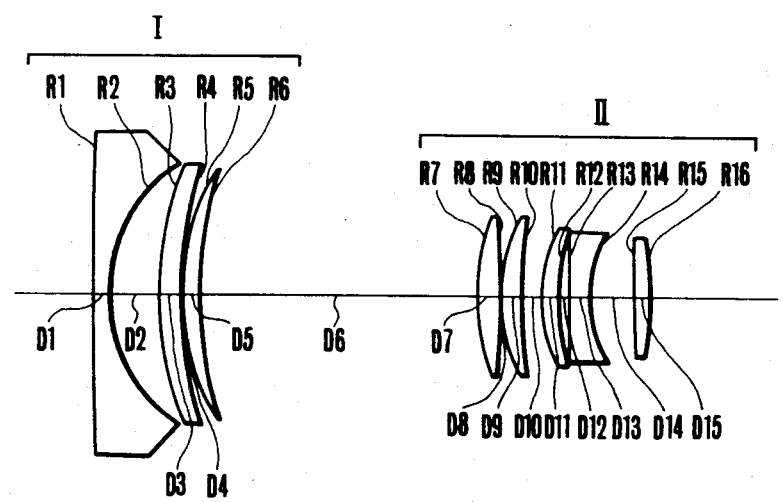
FIGS. 1, 3 and 5 are lens block diagrams of specific embodiments 1, 2 and 3 of the present invention respectively.
Figure 3:
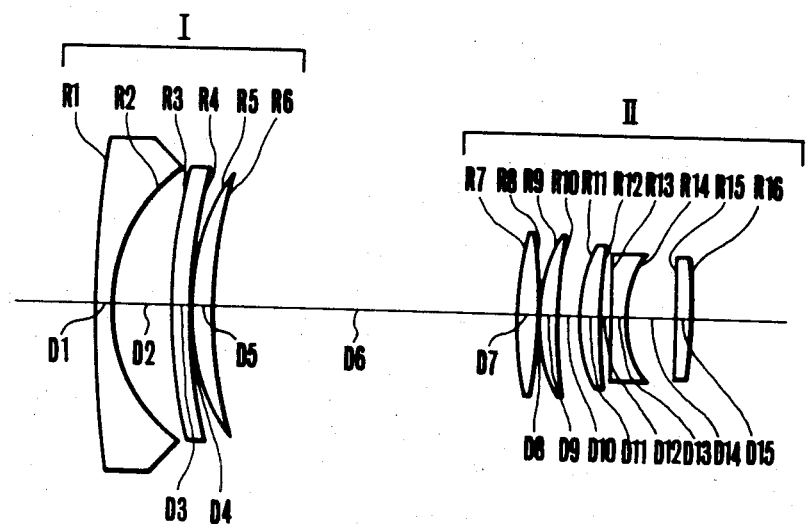
Figure 5:
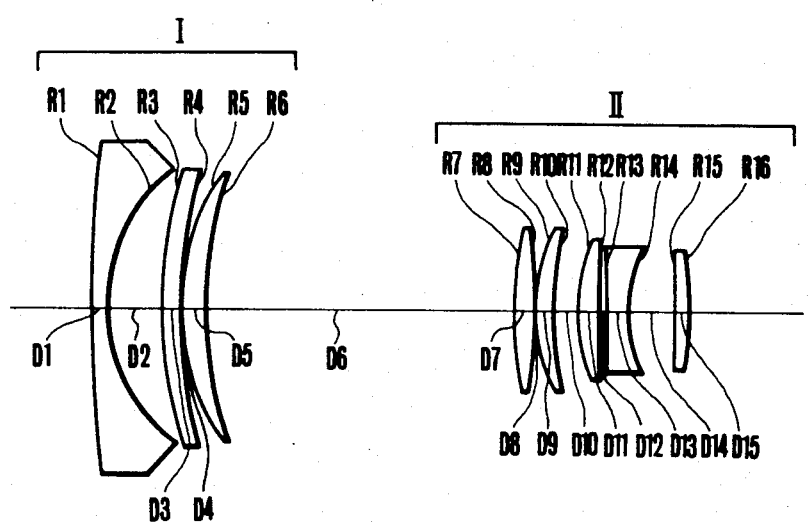

The embodiments of the present invention have as the lens configuration a zoom objective lens consisting of two lens groups, from front to rear, a negative first lens group and a positive second lens group, the axial separation between both the groups being variable to provide the aforesaid range of magnification change. The first lens group is constructed of three lens elements, thereby facilitating a minimization of the bulk and size of the complete zoom objective lens. This first lens group includes, from front to rear, a negative first lens, an aspheric meniscus second lens of very small refractive power, and a positive third lens. The second lens group comprises five lens members, from front to rear, a positive fourth lens, two meniscus lenses of forward convexity or positive fifth and sixth lenses, a negative meniscus seventh lens of forward convexity, and a bi-convex positive eighth lens.

According to the present invention, a zoom lens of this general type above described has the following features which enable the range to be extended towards wider angular fields, whilst maintaining good stability of aberration correction throughout the extended zooming range.

The 1st lens is configured to a meniscus shape with its rear surface providing a strong negative refractive power. This allows of lessening the distortion and astigmatism produced in the wide angle region.

The 2nd lens is most characteristic of the zoom objective of the invention in that the refractive power is very weak, and an aspheric surface is employed along with the meniscus form. The addition of this lens in between the 1st and 3rd lenses enables the number of lens elements in the 1st lens group to be greatly reduced, thus achieving the possibility of minimizing the bulk and size of the entire zoom lens system. In this connection, it should be explained that in general the zoom objective having a range with the inclusion of the wide angle region produces large negative distorion when zoomed in the wide angle settings, and, therefore, it is of great importance to correct the zoom objective of the character above described for the stabilization of the distortion. According to the prior art, the distortion has been corrected, in most cases by, increasing the number of lens members in the 1st lens group. Such increase of the lens number, however, makes the lens configuration complicated and also calls for an increase in the bulk and size of the complete zoom objective. Thus, this cannot be said to be desirable. With this in mind, to allow for as small a distortion as possible in the wide angle positions, we have first determined the form of the 1st lens, and then to further improve the aberration have made use of an aspheric surface in the 2nd lens. And the aspheric 2nd lens is then conformed to the air space between the 1st and 3rd lenses which takes a meniscus form of forward convexity at the outset of aberration correction. This is the reason why the 2nd lens is made in the meniscus form convex towards the front. Thus, we have succeeded in shortening the physical length of the 1st lens group and in limiting the outer diameter of the lens group to a minimum.

Further, another important point is that the refractive power of the 2nd lens is made very small. For instance, taking the shortest focal length as unity, we have found from embodiment 1 that the focal length of the 2nd lens is 116.2, from embodiment 2 that it is −57.1, and from embodiment 3 that it is −57.4. In other words, the 2nd lens has almost no refractive power. Because of this, even when the 2nd lens is made up of plastic material, good lens performance is assured. The aspherical lens of plastic material is easy to manufacture as compared with the ordinary aspherical lens of glass material. Moreover, the effect of the aspherical surface on aberrations is almost the same as that of the spherical surface of the ordinary optical glass. However, as the refractive index of the plastic material largely varies with temperature, the use of the plastic lens often causes an image shift with a loss in the imaging performance. For example, in the case of acrylic resin, the variation of the refractive index is about 10 times as large as the ordinary glass. For this reason, the lens made up of a plastic material having a strong refractive power can be hardly used in part of an objective from which a high grade imaging performance is demanded.

In the embodiments of the invention, therefore, the 2nd lens of plastic material is given almost no refractive power, for the absolute value of its focal length is made to be preferably not less than 30 times the shortest focal length. It is to be understood that the aim is to obtain merely the effect of the aspherical surface on aberration correction. This leads to success in realizing a zoom lens having high grade imaging performance almost insensitive to a change in the ambient temperature despite the fact that a plastic lens element is used in the zoom lens.

The 3rd lens is a positive meniscus lens convex towards the front affording the advantage that small spherical aberration is produced in the telephoto positions. If it takes the bi-convex form, under-correction of spherical aberration will result.

Three examples of specific zoom lenses of the invention may be constructed in accordance with the numerical data given in the following tables for the radii of curvature, R, the axial lens thicknesses and air separations, D, and the refractive indices N, and Abbe numbers, $\nu$, of the glasses of the various lens elements.

The aspherical surface is defined by the following equation where x is the amount of deviation of the aspherical surface from the basic spherical surface in the axial direction; $\gamma$ is the radius of curvature of the spherical surface; h is the height in a direction perpendicular to the optical axis; and B, C, D, and E are the aspherical coefficients.

$$x = \frac{\left(\frac{1}{\gamma}\right) h^2}{1 + \sqrt{1 - \left(\frac{h}{\gamma}\right)^2}} + Bh^4 + Ch^6 + Dh^8 + Eh^{10}$$

EXAMPLE 1

Focal Length f = 1–1.889 F-number: F/4
Image Angle 2ω = 62°–35.3°

| | | |
|---|---|---|
| R 1 = 7.2406 | D 1 = 0.078 | N1 = 1.55963  $\nu$ 1 = 61.2 |
| R 2 = 0.6019 | D 2 = 0.188 | |
| R 3 = 1.25 | D 3 = 0.083 | N2 = 1.49171  $\nu$ 2 = 57.4 |
| R 4 = 1.25 | D 4 = 0.004 | |
| R 5 = 0.8983 | D 5 = 0.072 | N3 = 1.69895  $\nu$ 3 = 30.1 |
| R 6 = 1.4305 | D 6 = l,(variable) | |
| R 7 = 1.0198 | D 7 = 0.08 | N4 = 1.60311  $\nu$ 4 = 60.7 |
| R 8 = −8.9645 | D 8 = 0.004 | |
| R 9 = 0.6294 | D 9 = 0.081 | N5 = 1.51633  $\nu$ 5 = 64.1 |
| R10 = 1.7542 | D10 = 0.085 | |
| R11 = 0.6201 | D11 = 0.063 | N6 = 1.51633  $\nu$ 6 = 64.1 |
| R12 = 1.01 | D12 = 0.035 | |
| R13 = 27.7494 | D13 = 0.086 | N7 = 1.80518  $\nu$ 7 = 25.4 |
| R14 = 0.4672 | D14 = 0.161 | |
| R15 = 2.2658 | D15 = 0.064 | N8 = 1.6668  $\nu$ 8 = 33. |
| R16 = −1.3509 | | |

The 4th surface is aspherical.
The aspherical coefficients:
$B = -1.9528 \times 10^{-1}$, $C = -7.9827 \times 10^{-1}$
$D = 2.5129$, $E = -1.1062 \times 10^{-1}$
f    1      1.389   1.889
l    1.075  0.454   0.031

EXAMPLE 2

Focal Length f = 1–1.893 F-number: F/4
Image Angle 2ω = 62°–35.2°

| | | |
|---|---|---|
| R 1 = 4.4342 | D 1 = 0.069 | N1 = 1.6223  $\nu$ 1 = 53.2 |
| R 2 = 0.6506 | D 2 = 0.215 | |
| R 3 = 1.9345 | D 3 = 0.078 | N2 = 1.49171  $\nu$ 2 = 57.4 |
| R 4 = 1.7857 | D 4 = 0.003 | |
| R 5 = 0.9298 | D 5 = 0.0871 | N3 = 1.68893  $\nu$ 3 = 31.1 |
| R 6 = 1.5693 | D 6 = l (variable) | |
| R 7 = 1.2556 | D 7 = 0.077 | N4 = 1.6968  $\nu$ 4 = 55.5 |
| R 8 = −7.5419 | D 8 = 0.003 | |
| R 9 = 0.6695 | D 9 = 0.073 | N5 = 1.60311  $\nu$ 5 = 60.7 |
| R10 = 1.3409 | D10 = 0.096 | |
| R11 = 0.6362 | D11 = 0.073 | N6 = 1.51633  $\nu$ 6 = 64.1 |
| R12 = 1.7980 | D12 = 0.041 | |
| R13 = 7.9597 | D13 = 0.069 | N7 = 1.80518  $\nu$ 7 = 25.4 |
| R14 = 0.4573 | D14 = 0.187 | |
| R15 = 9.4424 | D15 = 0.057 | N8 = 1.72825  $\nu$ 8 = 28.5 |
| R16 = −1.4520 | | |

The 4th surface is aspherical.
The aspherical coefficients:
$B = -1.3777 \times 10^{-1}$  $C = -2.872 \times 10^{-3}$
$D = -1.56775$  $E = 4.26359 \times 10^{-1}$
f    1      1.393   1.893
l    1.183  0.495   0.034

EXAMPLE 3

Focal Length f = 1–1.893 F-number: F/4
Image Angle 2ω = 62°–35.2°

| | | |
|---|---|---|
| R 1 = 5.734 | D 1 = 0.069 | N1 = 1.6223  $\nu$ 1 = 53.2 |
| R 2 = 0.655 | D 2 = 0.203 | |
| R 3 = 1.934 | D 3 = 0.078 | N2 = 1.49171  $\nu$ 2 = 57.4 |
| R 4 = 1.786 | D 4 = 0.003 | |
| R 5 = 0.922 | D 5 = 0.092 | N3 = 1.68893  $\nu$ 3 = 31.1 |
| R 6 = 1.636 | D 6 = l (variable) | |
| R 7 = 1.292 | D 7 = 0.076 | N4 = 1.6968  $\nu$ 4 = 55.5 |
| R 8 = −6.777 | D 8 = 0.003 | |
| R 9 = 0.655 | D 9 = 0.073 | N5 = 1.60311  $\nu$ 5 = 60.7 |
| R10 = 1.249 | D10 = 0.095 | |
| R11 = 0.636 | D11 = 0.078 | N6 = 1.51633  $\nu$ 6 = 64.1 |
| R12 = 1.989 | D12 = 0.038 | |
| R13 = 7.967 | D13 = 0.069 | N7 = 1.80518  $\nu$ 7 = 25.4 |
| R14 = 0.456 | D14 = 0.188 | |
| R15 = 8.7 | D15 = 0.058 | N8 = 1.72825  $\nu$ 8 = 28.5 |
| R16 = −1.482 | | |

-continued

Focal Length f = 1-1.893 F-number: F/4
Image Angle 2ω = 62°-35.2°

The 3rd surface is aspherical.
The aspherical coefficients:
B = 0.133   C = −0.469 × 10$^{-1}$
D = 1.7     E = −0.249

| f | 1 | 1.393 | 1.893 |
|---|---|-------|-------|
| l | 1.184 | 0.497 | 0.036 |

What is claimed is:

1. A wide angle zoom lens, comprising:

from front to rear, a first lens group of negative refractive power and a second lens group of positive refractive power and an air separation between said first and second lens groups;

the air separation between said first lens group and said second lens group being variable to effect zooming from a telephoto and to a wide angle end;

said first lens group, from front to rear, consisting of a first lens having a strong refractive power in the rear surface thereof, a second lens of plastic material and having an absolute value of paraxial focal length at least 30 times the focal length at a zooming position at the wide angle end, said second lens having at least one aspherical surface, and a third lens of meniscus form and of positive refractive power convex towards the front.

2. A wide angle zoom lens according to claim 1, in which the second lens and the third lens form an air lens having a converging function.

3. A wide angle zoom lens comprising:

from front to rear, a first lens group of negative refractive power and a second lens group of positive refractive power and forming an air separation between said first and second lens groups;

the air separation between said first lens group and said second lens group being variable to effect zooming between an extreme telephoto position and air entrance wide angle position;

said first lens group consisting of three lenses, said three lenses comprising, from front to rear, a first lens having a strong refractive power in the rear surface thereof, a second lens convex towards the front and having an absolute value of paraxial focal length at least 30 times the focal length at the extreme wide angle position and having at least one aspherical surface, and a third lens of meniscus form and of positive refractive force convex towards the front; and said second lens and the third lens forming an air lens having a converging function.

4. A wide angle zoom lens according to claim 3, in which said second lens is made of plastic material.

* * * * *